United States Patent [19]

Best et al.

[11] 4,441,182
[45] Apr. 3, 1984

[54] REPETITIOUS LOGIC STATE SIGNAL GENERATION APPARATUS

[75] Inventors: David W. Best, Marion; Jeffrey D. Russell, Cedar Rapids, both of Iowa

[73] Assignee: Rockwell International Corporation, El Segundo, Calif.

[21] Appl. No.: 264,178

[22] Filed: May 15, 1981

[51] Int. Cl.³ .................. G06F 11/00; G06F 11/14; G06F 11/22

[52] U.S. Cl. ......................................... 371/25; 371/16

[58] Field of Search ... 364/200 MS File, 900 MS File; 324/73 R; 371/16, 20, 21, 24, 25, 26, 27, 67, 71, 69

[56] References Cited

U.S. PATENT DOCUMENTS

| | | | |
|---|---|---|---|
| 3,518,413 | 6/1970 | Holtey | 371/16 |
| 3,579,199 | 5/1971 | Anderson et al. | 364/900 |
| 3,831,148 | 8/1974 | Greenwald et al. | 371/16 |
| 3,940,601 | 2/1976 | Henry et al. | 235/153 AC |
| 3,961,252 | 6/1976 | Eichelberger | 371/21 |
| 4,034,195 | 7/1977 | Bates | 371/25 |
| 4,047,163 | 9/1977 | Choate et al. | 371/10 |
| 4,107,649 | 8/1978 | Kurihara | 371/16 |
| 4,139,147 | 2/1979 | Franke | 371/25 |
| 4,249,173 | 2/1981 | Lockhart, Jr. | 324/73 R |
| 4,287,594 | 9/1981 | Shirasaka | 371/25 |
| 4,313,200 | 1/1982 | Nishiura | 371/25 |
| 4,335,457 | 6/1982 | Early | 371/21 |
| 4,357,703 | 11/1982 | Van Brunt | 371/15 |

OTHER PUBLICATIONS

*IBM Technical Disclosure Bulletin,* "Pattern Generator for a Mulipart Number Test System, " vol. 19, No. 9, Feb. 1977 pp. 3487-3488.

*Primary Examiner*—Jerry Smith
*Assistant Examiner*—Gary V. Harkcom
*Attorney, Agent, or Firm*—Bruce C. Lutz; George A. Montanye; H. Fredrick Hamann

[57] ABSTRACT

Apparatus as disclosed which comprises a register normally operable in the parallel data in/parallel data out mode but which has control mechanisms for allowing it to be converted to a serial data in/serial data out register. This register comprises part of a register based state machine. When the register is locked in a given mode so that a predefined control bit pattern is maintained within the register while the rest of the state machine operates in a normal manner, the control bit pattern is iteratively executed which in turn allows the use of an oscilloscope to observe signals in the signal transmission path of the state machine.

2 Claims, 2 Drawing Figures

REPETITIOUS LOGIC STATE SIGNAL GENERATION APPARATUS

INVENTION

The present invention is concerned generally with electronics and more specifically with register based state machine apparatus. Even more specifically, the present invention is concerned with the testing of components within a state machine using test equipment which requires cyclic input signals such as an oscilloscope.

In prior art state machines or computer structures, testing has been accomplished by various approaches. With discrete components, signals of an alternating character can be inserted in various places within the state machine and the resultant output signals can be observed with cyclic input signal detection devices such as an oscilloscope. As the state machines have increased in complexity and decreased in size, this approach to testing has become more of a problem to implement. Where the register comprises a single DIP package, the signal generator leads can be attached to the leads of a dummy DIP and still inserted into the circuit. However, the present invention is incorporated in a large scale integration (LSI) package and the insertion of signals through the use of a microscope and small leads on test pads within an LSI becomes complicated to the point of being unmanageable. In addition, there is a requirement that lands be incorporated in the device at all points in which signals need to be inserted or retrieved. The inclusion of such lands, of course, increases the architectural area for the circuit and is an undesirable approach to solving the test problem.

Through the use of test approaches such as suggested in our co-pending applications Ser. No. 264,179 and Ser. No. 264,177, both filed on the same date as the present invention and assigned to the same assignee, it may be noted that a control bit pattern could be serially shifted into the register and a JUMP control address could be utilized to force the state machine to JUMP to its own address. This would provide an iterative execution of a given microinstruction. However, this approach suffers in that (1) it assumes that the JUMP control and address logic paths are functional and (2) it forces the address field in the microinstruction to be used for that purpose, whereas it may be a shared field with other control functions which could then not be employed.

In view of the limitative formed by using an interative JUMP type instruction, the present approach utilizes the shift register to shift in a predefined control bit pattern and the control signals for mode and clock are then locked in a condition where the predefined control bit pattern is iteratively executed but returned signals are prevented from being loaded into the register. Microscopic control mechanisms may then be utilized to check signals at various places in the data path circuit through the use of oscilloscopic detection techniques.

It is thus an object of the present invention to provide improved test capability in state machines generally and large scale integration register based state machines specifically.

Other objects and advantages of the present invention, may be ascertained from a reading of the specification and appended claims in conjunction with the drawings, wherein:

FIG. 1 is a block diagram of a state machine incorporating the present inventive concept; and FIG. 2 is a detailed block diagram illustrating the shift register used to practice the invention within the confines of the state machine of FIG. 1.

DETAILED DESCRIPTION

Figure 1:
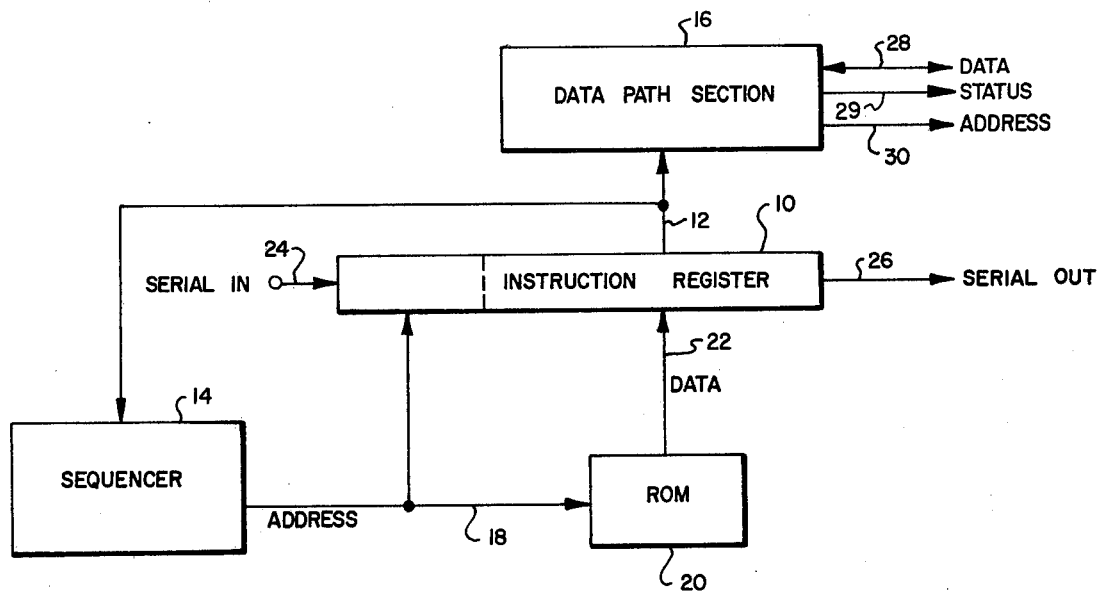

In FIG. 1, a microinstruction register or any other type of state control register 10, outputs data normally in parallel on a set of leads 12 to a sequencer block 14 as well as to a data path section 16. The sequencer 14 outputs addresses on a set of leads 18 after completing whatever sequences are involved with the particular instruction received on lead 12. These addresses on lead 18 are normally in parallel and are applied to a first section of the register 10, as well as to a ROM 20. The response (addressed word) to the address supplied to ROM 20 data is output in parallel on a set of leads 22 to a second portion of register 10. Register 10 also contains a serial data input lead 24 and a serial data output lead 26. The data path section block 16 receives and supplies data on lead 28 supplies status signals on lead 29, and outputs addresses to other areas of the state machine on a lead 30.

Figure 2:
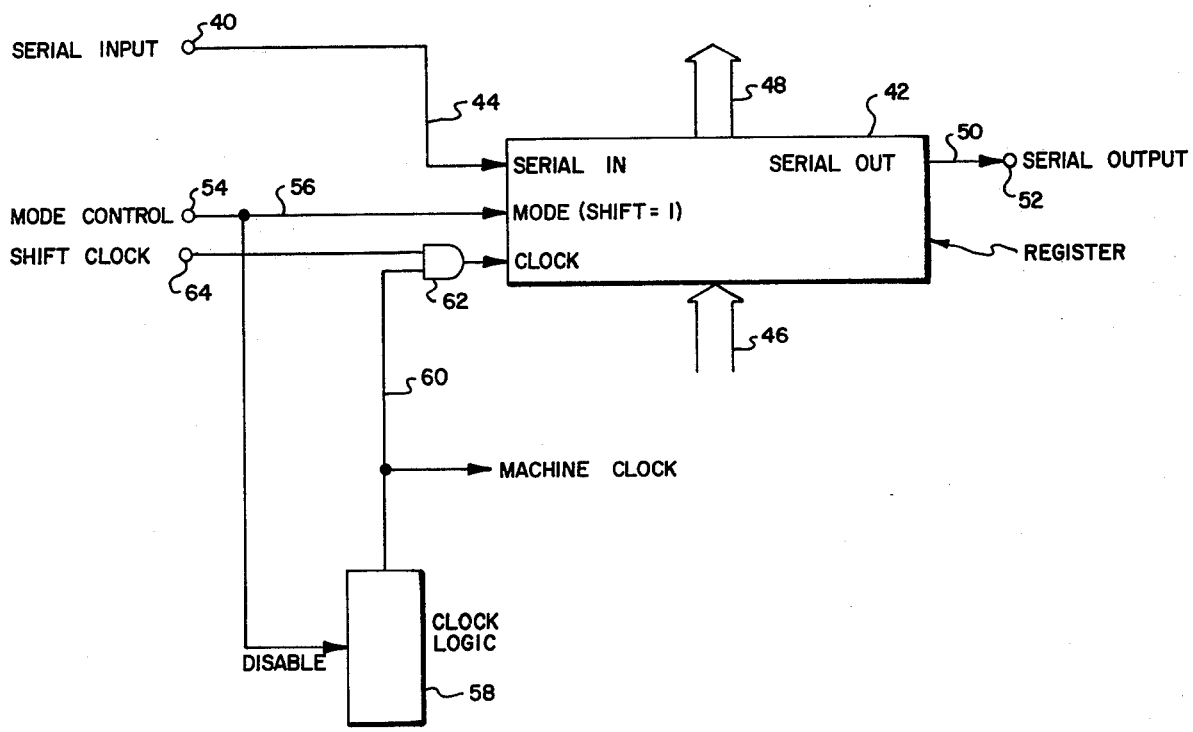

In FIG. 2, a serial input terminal means 40 is illustrated supplying data to a state control register 42 at a serial in terminal on a lead 44. The register 42 can have data loaded in parallel format on a set of leads 46 and can output from the register on a set of leads 48. Serial data is output from register 42 on a lead 50 to an output terminal means 52. A mode control terminal means 54 supplies signals on a lead 56 to a mode input of register 42, as well as to a disable input of a clock logic block 58. An output of clock logic block 58 appears on lead 60 to machine clock terminal means throughout the state machine of FIG. 1, as well as supplying a first input to an AND gate 62. An output of gate 62 supplies signals to a clock input of register 42. A shift clock terminal means 64 supplies input signals to a second input of AND gate 62.

OPERATION

Before continuing, it is necessary that certain clauses or words be defined. For the purposes of this specification, a "state" is a single group or set of logic values. A "state machine" is a device which can assume more than one set of logic values. A "register based state machine" is a state machine or other device in which the current (present) state is held in a register and the current state is replaced by the next state at a given increment in time as determined by a master timing signal which procedurely increments the logic states of the device in a manner as determined from the current machine state. The "current state" is an instruction or predefined bit pattern which will produce a known result. A "register" is a device for holding a group or set of logic values for a period of time as determined by the design of the register. By definition an "instruction" (this also includes microinstructions) comprises a predefined bit pattern held in a control memory which is used to control the state transition(s) of a state machine. The control memory can be either ROM or RAM.

The operation of the block diagram, as illustrated in FIG. 1, may be ascertained from a reading of the referenced co-pending application Ser. No. 264,179 wherein it is indicated that instructions are inserted into the register 10 from ROM 20 and when applied to the output result in further instructions generated from sequencer 14. Thus, the register based state machine operates in the manner of a normal computer for normal operating procedures and as an internal test device for the purposes described in the referenced application.

The register of FIG. 2 is utilized in the three modes of (1) normal, (2) serial and (3) iterative.

In normal operation with parallel loading and unloading, the mode control 54 is in an unasserted or logic zero level condition and the shift clock lead 64 is in logic one condition. In this mode the machine clock logic is enabled to produce pulses and these pulses are routed to both the instruction register or state control register 42 and to the remainder of the logic circuit as illustrated in FIG. 1. Thus, the current instruction or control bit pattern within register 42 will be executed, and then the next instruction will be parallel loaded from ROM into register 42 via leads 46.

In the serial mode, (used to test various instructions or control bit patterns as outlined in the first referenced co-pending application) the mode control terminal 54 is placed in an asserted or logic one condition. As a result, the machine clock logic block 58 is disabled by the signals appearing on lead 56 and the output from the logic on lead 60 is held constant in a logic one condition. Since the AND gate 62 is receiving a logic one on lead 60, it passes clock signals appearing on terminal 64 whenever they occur and the register is thus clocked to transfer data in a serial mode through the register 42, while not affecting the remainder of the logic circuitry of FIG. 1.

Finally, the apparatus of FIG. 2 can be placed in the iterative mode which mode is the subject matter of the present application. In this mode it may be assumed that a given control bit pattern or instruction has been inserted as would occur in the serial mode outlined in the above paragraph. If the mode control lead 54 is now placed in the logic zero or unasserted mode and the shift clock signal appearing on lead 64 is also held in the logic zero condition, the machine's clock logic block 58 is enabled to supply clock pulses to all of the apparatus of FIG. 1, except for register 42, since the AND gate 62 is not enabled. Thus, the contents of register 42 remain unchanged. This allows the predefined control bit pattern contained within register 42 to be iteratively executed, thereby allowing the use of a cyclical electrical signal detection device such as an oscilloscope to observe the signals throughout the state machine.

In summary, the inventive concept involves maintaining a predefined control bit pattern within register 42 and clocking the rest of the register based state machine in such a manner that it attempts to carry out the "instruction" as defined by register 42. Since this "instruction" remains in a constant state, the action of the machine repeats on each occurrence of the machine clock signal appearing of lead 60 and forms an iterative process which can be detected by cyclical electric signal detection devices such as an oscilloscope. The use of an oscilloscope is a definite aid in observing both waveform structure and absolute amplitudes in the detection of problems in my electronic circuit.

Although the circuit of FIG. 2 utilizes AND gates, it is to be realized that OR gates, AND/OR gates, NAND gates and NOR gate structure could be utilized to accomplish the same function through the use of different logic condition signals.

Therefore, we wish to be limited not by the specific embodiment illustrated but only by the scope of the appended claims, wherein we claim:

1. Apparatus for testing portions of a register based state machine, other than random access memory, which are affected by the clocking of the state machine by using a predefined control bit pattern comprising in combination:
   instruction register means including serial control signal input means and serial data output means;
   state responsive machine apparatus including said instruction register means;
   first means, connected to said instruction register means, for serially loading a predefined control bit pattern into said instruction register means through said serial control signal input means;
   second means, connected to said serial control signal input means of said instruction register means, for inhibiting said instruction register means from changing said predefined control bit pattern contained therein until a given test is complete;
   third means, including clock means, operating as part of said state machine apparatus for iteratively executing said predefined control bit pattern in said instruction register means through a clocking procedure over a predetermined period of time causing the repetitious execution of logical operations in the remaining portions of said state machine apparatus until said given test is complete;
   fourth means, for detecting in said remaining portions of said state machine, the resulting repetitiously occurring signals due to the repeated execution of said predefined control bit pattern in said instruction register by monitoring logic level values and associated lengths of time at each logic level value, said values being continuously altered by the clocking of said clock means until said given test is complete, and wherein said fourth means comprises cyclical input signal detection test equipment having no active part in the operation of said state machine apparatus.

2. The method of externally testing portions of a register based state machine, other than random access memory, which are affected by the clocking of the state machine with a predefined control bit pattern in an instruction register comprising the steps of:
   serially loading a predefined control bit pattern into an instruction register of a state machine;
   inhibiting said instruction register from changing said predefined control bit pattern until a given test is complete;
   iteratively executing said predefined control bit pattern in said instruction register through a clocking procedure over a predetermined period of time causing the repetitious execution of logical operations in the remaining portions of said state machine until said given test is complete;
   detecting, in said remaining portions of said state machine, repetitiously occurring signals due to the repeated execution of said predefined control bit pattern in said instruction register with cyclical input signal detection test equipment having no active part in the operation of said state machine, by monitoring logic levels and associated lengths of time at each logic level value, said value being continuously altered by said clocking procedure until said given test is complete.

* * * * *